United States Patent
Osanai et al.

(10) Patent No.: US 9,457,866 B2
(45) Date of Patent: Oct. 4, 2016

(54) OPERATION DEVICE OF STRADDLE TYPE VEHICLE

(71) Applicant: HONDA MOTOR CO., LTD., Tokyo (JP)

(72) Inventors: Takuya Osanai, Wako (JP); Yutaka Kikuchi, Wako (JP); Shiro Fukano, Wako (JP); Masahiro Miki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/663,945

(22) Filed: Mar. 20, 2015

(65) Prior Publication Data

US 2015/0274247 A1 Oct. 1, 2015

(30) Foreign Application Priority Data

Mar. 25, 2014 (JP) ................................. 2014-061534

(51) Int. Cl.
| | |
|---|---|
| B62K 23/00 | (2006.01) |
| B62K 23/04 | (2006.01) |
| G05G 1/01 | (2008.04) |
| G05G 1/02 | (2006.01) |
| G05G 1/10 | (2006.01) |
| G05G 5/03 | (2008.04) |
| B62K 11/14 | (2006.01) |

(52) U.S. Cl.
CPC .............. *B62K 23/04* (2013.01); *B62K 11/14* (2013.01); *G05G 1/01* (2013.01); *G05G 1/02* (2013.01); *G05G 1/10* (2013.01); *G05G 5/03* (2013.01); *Y10T 74/20012* (2015.01)

(58) Field of Classification Search
CPC combination set(s) only.
See application file for complete search history.

(56) References Cited

U.S. PATENT DOCUMENTS

| | | | | |
|---|---|---|---|---|
| 5,941,188 | A * | 8/1999 | Takashima | B63B 49/00 114/55.5 |
| 6,225,584 | B1 * | 5/2001 | Ase | B62K 11/14 200/61.54 |
| 6,832,511 | B2 * | 12/2004 | Samoto | B62K 23/04 73/114.36 |
| 7,757,581 | B2 * | 7/2010 | Okamoto | B62K 23/04 74/502.6 |
| 7,938,036 | B2 * | 5/2011 | Mochizuki | F16D 13/52 180/219 |
| 8,051,939 | B2 * | 11/2011 | Kondo | B62K 11/14 123/349 |
| 8,230,962 | B2 * | 7/2012 | Rioux | B62K 5/027 180/336 |
| 8,278,912 | B2 * | 10/2012 | Cavallo | B62K 23/04 324/207.2 |
| 8,516,992 | B2 * | 8/2013 | Akatsuka | B62K 11/14 123/399 |
| 8,525,793 | B2 * | 9/2013 | Sentchenkoff | B60K 35/00 345/156 |
| 8,567,282 | B2 * | 10/2013 | Yaguchi | B62K 23/04 74/504 |
| 2004/0216550 | A1 * | 11/2004 | Fallak | B62K 23/04 74/551.9 |
| 2005/0081672 | A1 * | 4/2005 | Chen | B62K 23/04 74/485 |
| 2008/0184839 | A1 * | 8/2008 | Negri | B62K 11/14 74/489 |
| 2010/0059304 | A1 * | 3/2010 | Deguchi | B62K 11/14 180/336 |
| 2010/0270135 | A1 * | 10/2010 | Murasawa | B60K 20/06 200/61.88 |
| 2012/0266717 | A1 * | 10/2012 | Sakai | B62K 11/14 74/551.9 |
| 2013/0111983 | A1 * | 5/2013 | Mauch | G01M 15/00 73/114.36 |
| 2013/0257416 | A1 * | 10/2013 | Nomura | G01B 7/30 324/207.13 |
| 2015/0274242 | A1 * | 10/2015 | Osanai | B60K 23/02 74/491 |
| 2015/0274246 | A1 * | 10/2015 | Ichikawa | G05G 1/02 74/471 R |
| 2015/0274248 | A1 * | 10/2015 | Osanai | B62K 23/04 74/471 R |

FOREIGN PATENT DOCUMENTS

| | | | |
|---|---|---|---|
| JP | 2007-530335 A | 11/2007 | |
| JP | 2009-056872 A | 3/2009 | |
| JP | 2010-064618 A | 3/2010 | |
| JP | 2011-194993 A | 10/2011 | |
| JP | 2013-189023 A | 9/2013 | |
| WO | WO 2005/092698 A1 | 10/2005 | |
| WO | WO 2015010625 A2 * | 1/2015 | ............ B62K 23/04 |

* cited by examiner

*Primary Examiner* — Nicole Verley
(74) *Attorney, Agent, or Firm* — Squire Patton Boggs (US) LLP (57) ABSTRACT

An operation device of a straddle type vehicle includes a controller used to select multiple function menus of equipment incorporated in the straddle type vehicle. The controller has a rotary selection controller constituting a part of a grip portion, and provided adjacent to a switch box. A rotation detection portion is provided in the switch box, and detects rotation of the selection controller.

11 Claims, 10 Drawing Sheets

OPERATION DEVICE OF STRADDLE TYPE VEHICLE

BACKGROUND

1. Field

The present invention relates to an operation device of a straddle type vehicle used for equipment operation such as operation of audio or a navigation system, switching of a meter display, and switching of traveling modes.

2. Description of the Related Art

As in Patent Document 1 (Published Japanese Translation of PCT International Application No. 2007-530335), a structure is proposed in which a dial-type operation ring rotating around the center axis of a handle bar is attached to a position on the inner side of a grip in the periphery of the handle bar. In a normal straddle type vehicle, a switch box including one or multiple controllers operated with the rider's finger is arranged adjacent to an inner end portion of a grip of a handle bar. Accordingly, in the case of Patent Document 1, the operation ring having a larger outer diameter than the grip is additionally provided between the inner end portion of the handle grip and the switch box. Hence, to operate the controller provided in the switch box, the controller needs to be operated by stretching the finger holding the grip over the operation ring, and thus it is difficult to operate the controller in the switch box.

In view of the above problem, Patent Document 2 (Japanese Patent Application Publication No. 2013-189023) discloses that a rotary controller capable of selecting function menus related to on-vehicle audio and navigation system is provided in a switch box. This facilitates operation such as selection of a function menu, without changing the operability of other controllers in the switch box.

Otherwise, certain controllers may be arranged in a grip portion. From this viewpoint, Patent Document 3 (Japanese Patent Application Publication No. 2009-56872) discloses that a handle transmission switch having two controllers is provided in a lower part of a grip.

However, in the technique described in Patent Document 2, the additional rotary controller is to be provided in a space among existing switches in the switch unit. This limits freedom in arrangement, as well as requires consideration in operation to sensuously discriminate the rotary controller from other switches.

In Patent Document 3, since the handle transmission switch is provided in the lower part of the grip, it is clearly discriminable from other switches. However, the handle transmission switch is provided so as to protrude from the lower part of the handle grip, which causes discomfort when the rider holds the grip.

SUMMARY

Against this background, the present invention aims to provide an operation device of a straddle type vehicle that facilitates multiple operations such as selection of a function menu of on-vehicle equipment, while favorably maintaining operability of switches arranged in an existing switch box, and facilitating discrimination from the existing switches, without causing discomfort in holding a grip.

An operation device of a straddle type vehicle according to embodiments of the present invention has numerous characteristics. The device can include a switch box having multiple switches, and provided adjacent to and on the inner side in the axial direction of a grip portion, which is held by a rider and provided on both left and right ends of a handle bar extending in the left-right direction of the straddle type vehicle. A controller used to select multiple function menus of equipment can be incorporated in the straddle type vehicle. The controller has a rotary selection controller constituting a part of the grip portion, and provided adjacent to the switch box. A rotation detection portion is provided in the switch box, and is configured to detect rotation of the selection controller.

In another embodiment, the controller has a determination controller for determining a function menu selected by the selection controller. The determination controller is provided separately from the selection controller, in such a manner as to protrude toward the selection controller side from the switch box.

In another embodiment, the selection controller has an enlarged diameter portion on the side adjacent to the switch box, A rotation detected body is provided in the enlarged diameter portion. The rotation detection portion is provided on a wall portion of the switch box facing the enlarged diameter portion, and is configured to detect rotation of the rotation detected body.

In another embodiment, a click mechanism is configured to generate a clicking sense at every constant angle in the rotary operation of the selection controller. The click mechanism is provided between the enlarged diameter portion and the switch box facing the enlarged diameter portion.

In another embodiment, the selection controller has an insertion portion inserted into the switch box. A rotation detected body is provided in the insertion portion. The rotation detection portion is provided inside the switch box, and is configured to detect rotation of the rotation detected body, and another click mechanism is provided for generating a clicking sense at every constant angle in the rotary operation of the selection controller. This click mechanism is disposed between the insertion portion and an inner wall of the switch box.

According to a first characteristic of the present invention, the selection controller used to select multiple function menus of equipment is arranged in a position different from the multiple switches provided in the switch box normally used in a straddle type vehicle. Accordingly, it is possible to prevent the rider from confusing operation of the multiple switches and operation of the selection controller. Additionally, since the selection controller constitutes a part of the handle grip, the rider can easily select a function menu, by rotating the selection controller with at least some of the fingers while keeping hold of the grip portion. Since a part of the handle grip is used to function as the selection controller, there is no need to provide a controller between the grip portion and the switch box, and thus ease in operation of the multiple switches provided in the switch box can be maintained. Moreover, since the rotation detection portion for detecting rotation of the selection controller is provided in the switch box, there is no need to provide an additional supporting member for supporting the rotation detection portion, and thus the selection controller and the switch box can be compactly arranged close to each other.

According to another characteristic of the present invention, since the determination controller for determining the function menu selected by the selection controller is provided, selection and determination of the function menu can be carried out by different controllers, whereby confusion in operation can be prevented. Since the determination controller is provided so as to protrude toward the selection controller side from the switch box, the determination controller can be arranged in the vicinity of the selection controller, so that determination after selection of the function menu can be made easily.

According to another characteristic of the present invention, since the rotation detected body is provided in the enlarged diameter portion that prevents contact between the left hand of the rider gripping the grip portion and the switch box, there is no need to provide an additional member for supporting the rotation detected body. Additionally, since the rotation detection portion is provided in the wall portion of the switch box facing the rotation detected body provided in the enlarged diameter portion, the rotation detection portion can be provided with the selection controller and the switch box arranged close to each other.

According to another characteristic of the present invention, since the click mechanism for generating a clicking sense at every constant angle is provided, the rider can feel the operation of the selection controller. For example, if the clicking sense is generated every time the selected function menu is switched, the switching of the selected function menu can be recognized by the feel, and thus the function menu can be selected easily.

According to yet another characteristic of the present invention, since the rotation detected body, the rotation detection portion, and the click mechanism are provided inside the switch box where dirt or water, for example, is less likely to enter, a variety of models and kinds of the rotation detected body, the rotation detection portion, and the click mechanism can be employed. Additionally, since the click mechanism for generating a clicking sense at every constant angle is provided, the rider can feel the operation of the selection controller. For example, if the clicking sense is generated every time the selected function menu is switched, the switching of the selected function menu can be recognized by the feel, and thus the function menu can be selected easily.

DETAILED DESCRIPTION

Hereinbelow, a detailed description is given of an operation device of a straddle type vehicle according to the present invention, by use of preferable embodiments and with reference to the accompanying drawings.

Figure 1:
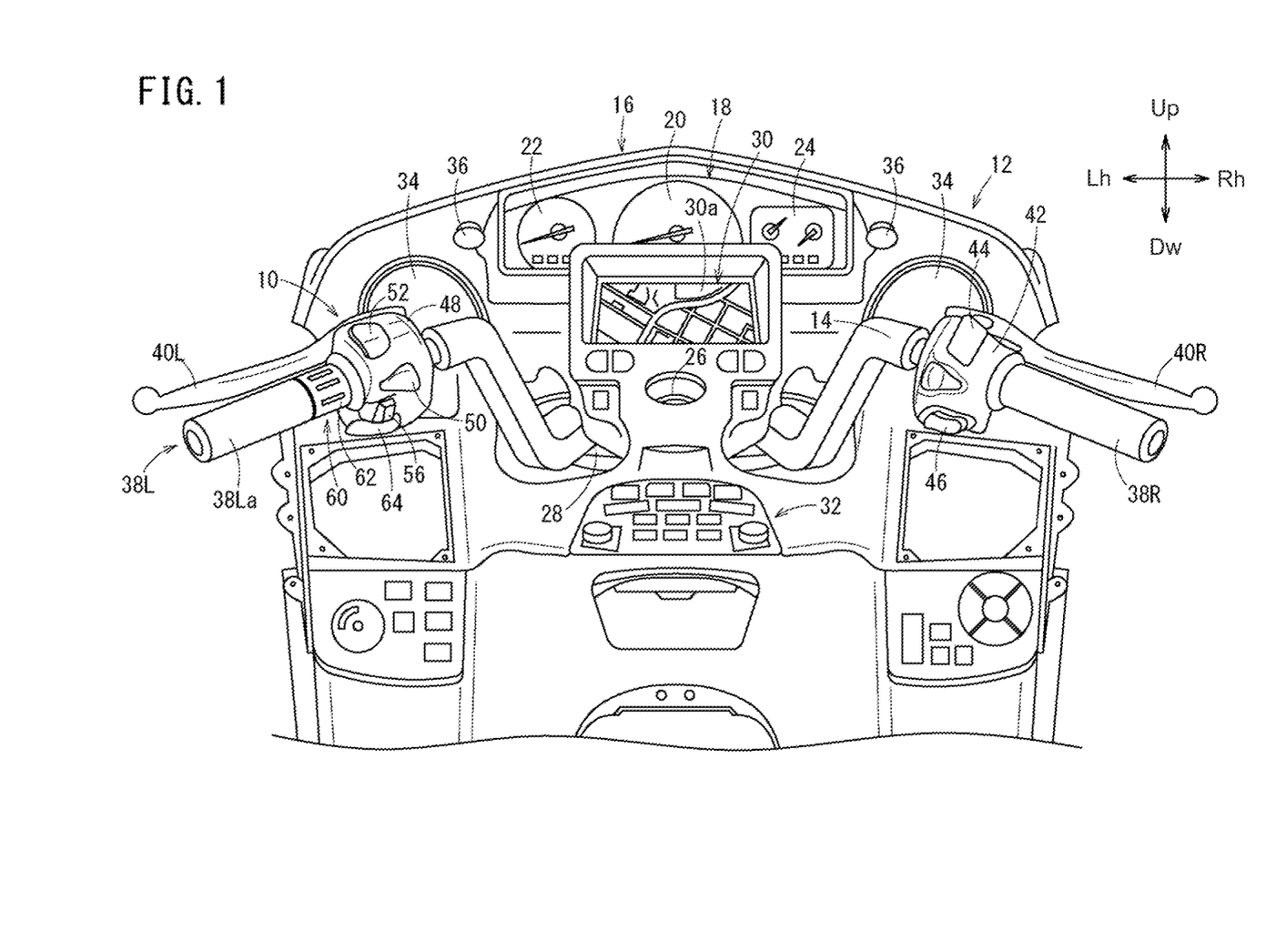
FIG. 1 is a partially enlarged view around a handle bar of a straddle type vehicle such as a motorcycle, which includes an operation device according to a first embodiment.

FIG. 1 is a partially enlarged view around a handle bar 14 of a straddle type vehicle 12 such as a motorcycle, which includes an operation device 10 according to a first embodiment. FIG. 1 is a downward view of the periphery of the handle bar 14 as seen from the rear upper direction of the vehicle, and is substantially the same state as seen from a rider sitting on an unillustrated seat of the straddle type vehicle 12. Note that the traveling direction of the straddle type vehicle 12 is regarded as the front, while left and right, as well as upper and lower directions are described on the basis of the direction seen from the rider sitting on the seat of the straddle type vehicle 12, if not stated otherwise.

The vehicle front side of the handle bar 14 steering an unillustrated front wheel of the straddle type vehicle 12 is covered with a front cowl 16, and a meter device (equipment) 18 is arranged in an upper part inside the front cowl 16. The meter device 18 includes a tachometer 20 for displaying the number of revolutions of a drive source, such as an unillustrated engine or a motor. A speedometer 22 displays the speed of the straddle type vehicle 12. Gauges 24 include a fuel gauge and the like. The meter device 18 is a liquid crystal display, and is a so-called meter display whose screen display can be switched according to the rider's selection. Note that organic EL may be used instead of liquid crystal for the display. That is, the meter device 18 may be an organic EL display.

The front wheel is pivotally supported in a rotatable manner by unillustrated paired left and right front forks, and an upper portion of the paired left and right front forks is connected and fixed to a top bridge 28, to which a main switch 26 is attached. The top bridge 28 is rotatably attached to an unillustrated head pipe constituting a body frame, through an unillustrated steering stem. This handle bar 14 is fixed to an upper portion of the top bridge 28.

A display portion (equipment) 30a of a navigation system 30 is arranged in the upper center of the top bridge 28 at the rear of the meter device 18, while an audio unit (equipment) 32 including functions such as an FM/AM tuner, a digital audio player unit, and an amplifier is arranged on the rear side of the display portion. The display portion 30a is also used to display a song selected in the audio unit 32, or other function menus, for example. Mid-bass Speakers 34, 34 for reproducing mid-bass tones from the audio unit 32 are arranged on the left and right of the meter device 18, and high-tone speakers 36, 36 for reproducing high tones are arranged between the speakers 34, 34 and the meter device 18.

Resin handle grips (grip portions) 38L, 38R to be held by the rider are attached to both left and right end portions of the handle bar 14. A front brake lever 40R is provided in front of the right handle grip 38R. The front brake lever 40R is a controller for applying a braking force to the front wheel according to the rider's manual operation. The right handle grip 38R is an accelerator controller for manually controlling the speed of the straddle type vehicle 12, and is supported so as to be rotatable with respect to the handle bar 14. A clutch lever 40L is provided in front of the left handle grip 38L. The clutch lever 40L is a controller for disconnecting transmission of drive force of the drive source to a speedchange gear (not shown) according to the rider's manual operation. Specifically, transmission of drive force of the drive source to the speedchange gear is disconnected by operating the clutch lever 40L, and drive force of the drive source is transmitted to the speed change gear by releasing operation of the clutch lever 40L.

A switch box 42 arranged adjacent to the handle grip 38R on the inner side of the handle grip 38R in the axial direction, is provided on the right handle bar 14. Various electric equipment switches, such as an engine stop switch 44 and a starter switch 46 are provided in the switch box 42. The engine stop switch 44 is a seesaw switch that maintains a position on the on or off side unless an operation force is applied, and brings the engine to an emergency halt when it is operated to the offside during operation of the drive source. The pressing type starter switch 46 is a controller for starting the engine, and starts the engine when it is operated while the main switch 26 is turned on and the speed change gear is in the neutral state.

In addition, the operation device 10 in some embodiments of the present invention is provided on the left handle bar 14. The operation device 10 has a switch box 48 provided on the left handle bar 14, adjacent to the handle grip 38L on the inner side of the handle grip 38L in the axial direction. Various electric equipment switches, such as a horn switch 50, an optical axis shift switch 52, and a turn signal or winker switch 56 are provided in the switch box 48.

The horn switch 50 is a pressing type switch for sounding an unillustrated horn of the straddle type vehicle 12, and is arranged at approximately the same height as an axis line C of the handle grip 38L (center axis of the handle bar 14) in the vertical direction of the vehicle body. The optical axis shift switch 52 is a seesaw switch for switching an unillustrated headlight of the straddle type vehicle 12 to low beam or high beam, and is arranged above the horn switch 50. The winker switch 56 is a switch operated by being tilted to the left or right to actuate an unillustrated direction indicator (winker lamp) of the straddle type vehicle 12, and is arranged below the horn switch 50.

The operation device 10 can further include a controller 60, which is used to select an arbitrary function menu from multiple function menus of equipment such as a navigation system 30 and the audio unit 32. The controller 60 is also used to select a function menu for switching the display menu displayed on the meter device 18, or a function menu for displaying a vehicle settings menu. The controller 60 has a rotary selection controller 62 constituting a part of the handle grip 38L, and a determination controller 64 for determining the function menu selected by the selection controller 62. Note that a part of the handle grip 38L not constituting the selection controller 62 is referred to as a grip portion 38La. The length of the selection controller 62 may be less than half of, or desirably not more than one third of the entire length of the handle grip 38L. This can ensure a sufficient length of the grip portion 38La, so that the rider can favorably keep hold of the grip portion 38La.

The selection controller 62 is provided adjacent to the switch box 48, and can be rotated in a first or second direction to scroll forward or backward through the function menus to be selected. The button type determination controller 64 is arranged in the switch box 48 in such a manner as to protrude to the selection controller 62 side from the switch box 48. That is, the selection controller 62 and the determination controller 64 are provided separately. Note that the determination controller 64 is provided below the winker switch 56.

Figure 2:
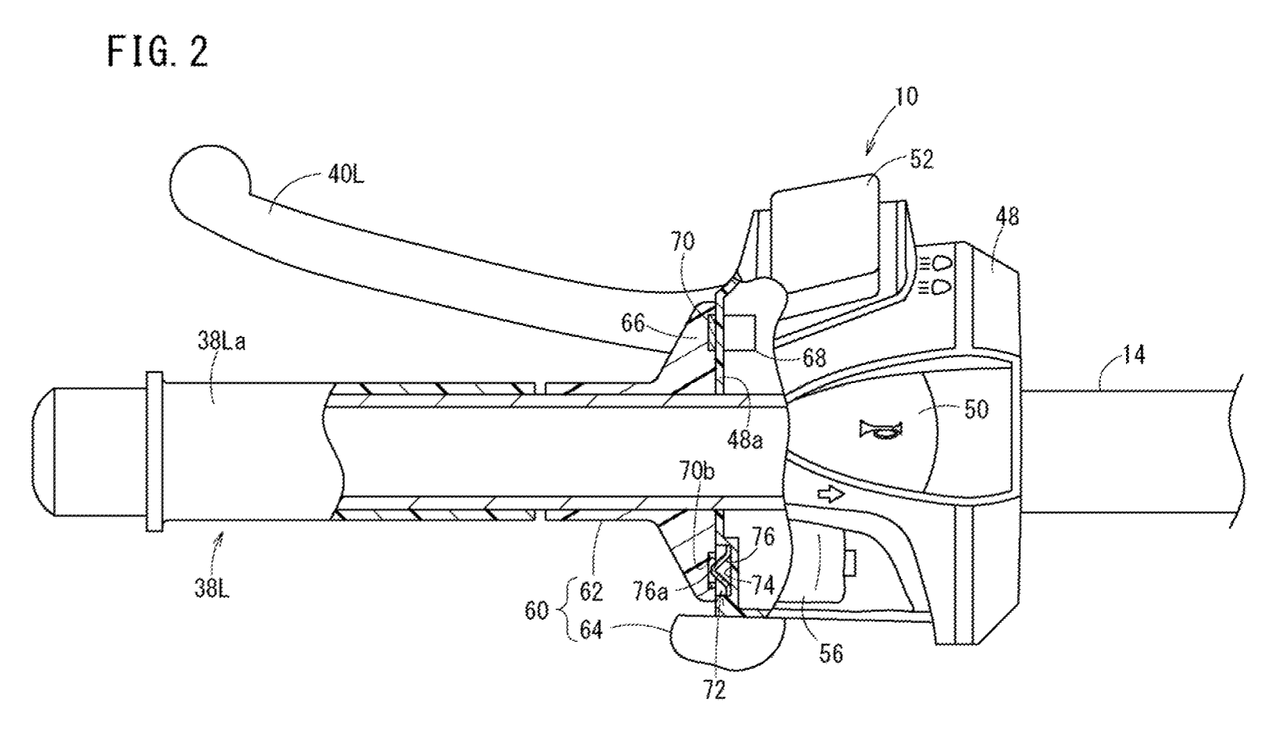
FIG. 2 is a cross-sectional view of main portions of a handle grip and a switch box, which constitute the operation device of the first embodiment.

FIG. 2 is a cross-sectional view of main portions of the handle grip 38L and the switch box 48, which constitute the operation device 10. The selection controller 62 is rotatable with respect to the handle bar 14, and has an enlarged diameter portion 66 on the side adjacent to the switch box 48. The enlarged diameter portion 66 is formed such that its diameter increases toward the switch box 48 side, and prevents the left hand gripping the handle grip 38L from contacting the switch box 48. The handle grip 38L has a constant diameter except for the enlarged diameter portion 66. A rotation detection portion 68 for detecting rotation of the selection controller 62 is provided inside the switch box 48, on a wall portion 48a of the switch box 48 facing the enlarged diameter portion 66.

Figure 3:
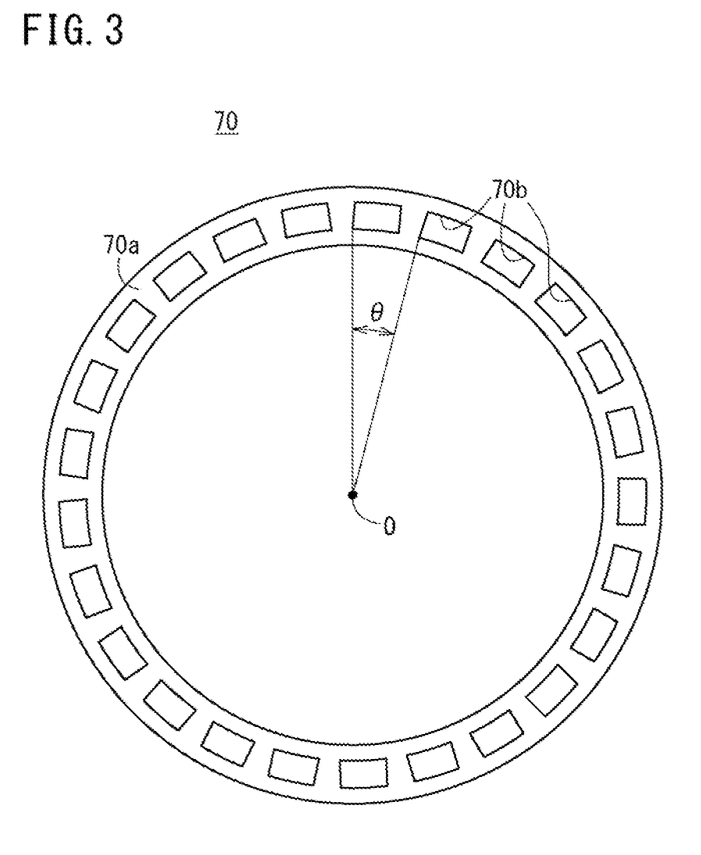
FIG. 3 is a view showing a rotation detected body of FIG. 2.

A rotation detected body 70 is provided in the enlarged diameter portion 66. In this embodiment, the rotation detected body 70 is provided in an end portion of the enlarged diameter portion 66 on the switch box 48 side. As shown in FIG. 3, this rotation detected body 70 is a magnetic body configured of an annular ring 70a, and multiple opening portions 70b provided in a penetrating manner along the outer circumference of the ring 70a. The multiple opening portions 70b are provided so as to form a circle at constant angle θ intervals, by using a center O of the annular ring 70a (rotation detected body 70) as a reference point.

The rotation detection portion 68 is provided so as to face the rotation detected body 70, and detects rotation of the selection controller 62 by detecting rotation of the rotation detected body 70. Although not shown, the rotation detection portion 68 has a magnetic sensor with magnet, configured of a hall effect sensor and a magnet. The rotation detection portion 68 is a known device, in which the hall effect sensor detects variation in magnetic flux of the magnet, occurring between a state where the opening portion 70b faces the hall effect sensor, and a state where the opening portion does not face the hall effect sensor, to thereby detect rotation of the rotation detected body 70. Hence, rotation of the selection controller 62 rotated by the rider also causes the rotation detected body 70 to rotate, so that the rotation is detected by the rotation detection portion 68.

Additionally, a click mechanism 72 for generating a clicking sense at every constant angle θ in the rotary operation of the selection controller 62 is provided, between the enlarged diameter portion 66 and the switch box 48 facing the enlarged diameter portion 66. The click mechanism 72 is configured of: a flat spring 76 provided in a concave portion 74 formed in the wall portion 48a of the switch box 48 on the selection controller 62 side, and the rotation detected body 70. The flat spring 76 is provided so as to face the rotation detected body 70. The flat spring 76 has a protruding portion 76a protruding from its center toward the rotation detected body 70.

When the opening portion 70b of the rotation detected body 70 faces the protruding portion 76a, the protruding portion 76a is inserted into the opening portion 70b. Meanwhile, when a part other than the opening portion 70b of the rotation detected body 70 faces the protruding portion 76a, the protruding portion 76a is pressed against the biasing force of the flat spring 76. Thus, rotation of the selection controller 62 causes the flat spring 76 to generate a clicking sense at every constant angle θ. Note that a clicking sense refers to a sound, feeling or the like caused by pressing a switch.

Figure 4:
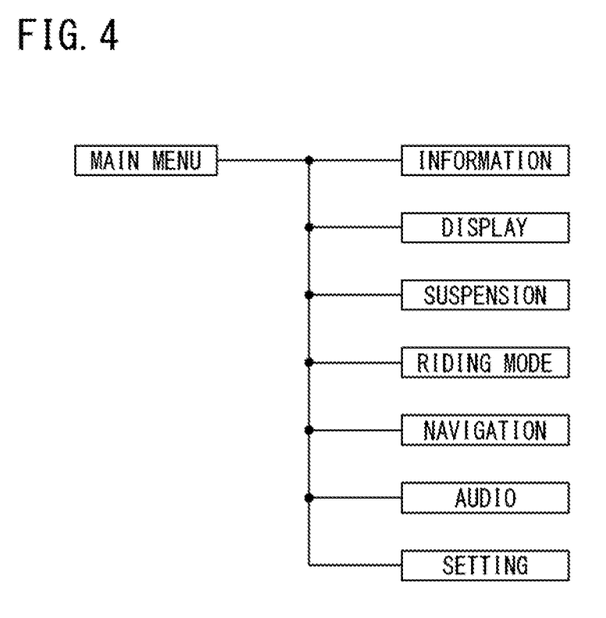
FIG. 4 is a view showing the hierarchy of function menus of equipment such as a navigation system and an audio unit, displayed on a display portion.

FIG. 4 is a view showing the hierarchy of function menus of equipment such as the navigation system 30 and the audio unit 32, displayed on the display portion 30a. When the determination controller 64 is pressed with the left thumb holding the handle grip 38L while "MAIN MENU," which is a function menu displayed on the display portion 30a, is selected, selection of "MAIN MENU" is determined. When "MAIN MENU" is determined, "INFORMATION," "DISPLAY," "SUSPENSION," "RIDING MODE," "NAVIGA- TION," "AUDIO," and "SETTING," which are lower-level function menus than "MAIN MENU," are displayed on the display portion 30a.

"INFORMATION" is a function menu for displaying various information related to traveling, "DISPLAY" is a function menu for switching the display menu displayed on the meter device 18, and "SUSPENSION" is a function menu for displaying setting information related to suspension, such as damping force and vehicle height. "RIDING MODE" is a function menu for displaying states related to output characteristics of the engine, such as power traveling mode and wet weather traveling mode, and "NAVIGATION" is a function menu for displaying various information by the navigation system 30. "AUDIO" is a function menu for displaying audio information, and "SETTING" is a function menu for displaying setting states of various equipment.

Then, the cursor position indicating the selected function menu is scrolled, by rotating the selection controller 62 with the left index finger and thumb while keeping hold of the handle grip 38L with the left hand. For example, when the selection controller 62 is rotated in a first direction, the cursor position is scrolled forward through the function menus, i.e., in the order of "INFORMATION"→"DISPLAY"→"SUSPENSION"→"RIDING MODE"→"NAVIGATION"→"AUDIO"→"SETTING"→"INFORMATION." On the other hand, when the selection controller 62 is rotated in a second direction, the cursor position is scrolled backward through the function menus, i.e., in the order of "INFORMATION"→"SETTING"→"AUDIO"→"NAVIGATION"→"RIDING MODE"→"SUSPENSION"→"DISPLAY"→"INFORMATION." The cursor position is switched according to a rotation angle detected by the rotation detection portion 68. In other words, the displayed cursor position changes every time the rotation detection portion 68 detects rotation at a predetermined angle.

Note that the selected function menu may be switched every time the rotation detection portion 68 detects a constant angle θ. For example, the timing at which the clicking sense is generated by the click mechanism 72 may be synchronized with the timing at which the cursor position is switched.

Then, when the determination controller 64 is pressed while any of "INFORMATION," "DISPLAY," "SUSPENSION," "RIDING MODE," "NAVIGATION," "AUDIO," and "SETTING" is selected, information on the selected function menu is displayed.

Thus, according to the first embodiment, the selection controller 62 used to select multiple function menus of equipment such as the navigation system 30 and the audio unit 32, is arranged in a position different from the multiple switches provided in the switch box 48 normally used in the straddle type vehicle 12. Accordingly, it is possible to prevent the rider from confusing operation of the multiple switches in the switch box 48 and operation of the selection controller 62.

The selection controller 62 constitutes a part of the handle grip 38L. Hence, the rider can easily select a function menu, by rotating the selection controller 62 with at least some of the fingers (such as the index finger and the thumb) while keeping hold of the handle grip 38L. Additionally, since a part of the handle grip 38L is used to function as the selection controller 62, there is no need to provide a controller between the handle grip 38L and the switch box 48, and thus ease in operation of the multiple switches provided in the switch box 48 can be maintained.

Since the rotation detection portion 68 for detecting rotation of the selection controller 62 is provided in the switch box 48, there is no need to provide an additional supporting member for supporting the rotation detection portion 68, and thus the selection controller 62 and the switch box 48 can be compactly arranged close to each other.

Since the determination controller 64 for determining the function menu selected by the selection controller 62 is provided, selection and determination of the function menu can be carried out by different controllers, whereby confusion in operation can be prevented. Since the determination controller 64 is provided so as to protrude toward the selection controller 62 side from the switch box 48, the determination controller 64 can be arranged in the vicinity of the selection controller 62, so that determination after selection of the function menu can be made easily.

Since the rotation detected body 70 is provided in the enlarged diameter portion 66 that prevents contact between the left hand of the rider gripping the handle grip 38L and the switch box 48, there is no need to provide an additional member for supporting the rotation detected body 70. Since the rotation detection portion 68 is provided in the wall portion 48a of the switch box 48 facing the rotation detected body 70 provided in the enlarged diameter portion 66, the rotation detection portion 68 can be provided with the selection controller 62 and the switch box 48 arranged close to each other.

Since the click mechanism 72 for generating a clicking sense at every constant angle θ is provided, the rider can feel the operation of the selection controller 62. For example, if the clicking sense is generated every time the selected function menu is switched, the switching of the selected function menu can be recognized by the feel, and thus the function menu can be selected easily.

Figure 5:
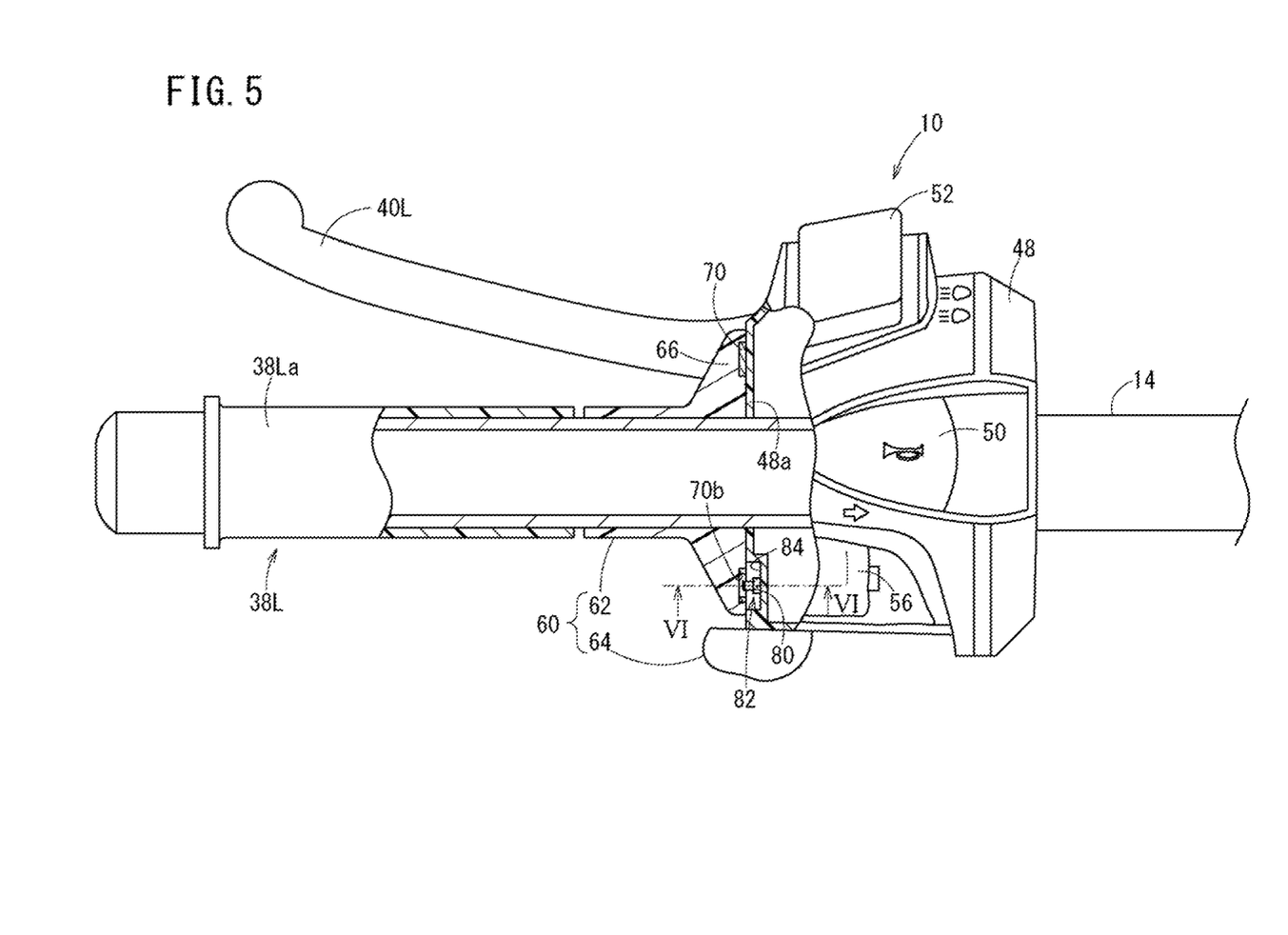
FIG. 5 is a cross-sectional view of main portions of a handle grip and a switch box, which constitute an operation device of a modified example of the first embodiment.

In a modified example of the first embodiment, a click mechanism 82 having a rotation detection portion 80 for detecting rotation of a selection controller 62 is provided, in place of the rotation detection portion 68 and the click mechanism 72 of the first embodiment. Note that in the modified example, a configuration having a similar function as the first embodiment is assigned the same reference numeral, and descriptions thereof will be omitted unless otherwise required.

FIG. 5 is a cross-sectional view of main portions of a handle grip 38L and a switch box 48, which constitute an operation device 10 of the modified example. The rotation detection portion 80 is provided on a wall portion 48a of a switch box 48 facing an enlarged diameter portion 66 (rotation detected body 70). The rotation detection portion 80 is provided in a concave portion 84 formed in the wall portion 48a of the switch box 48 on the selection controller 62 side. The rotation detection portion 80 and the rotation detected body 70 constitute a click mechanism 82 for generating a clicking sense at every constant angle θ in the rotary operation of the selection controller 62.

Figure 6:
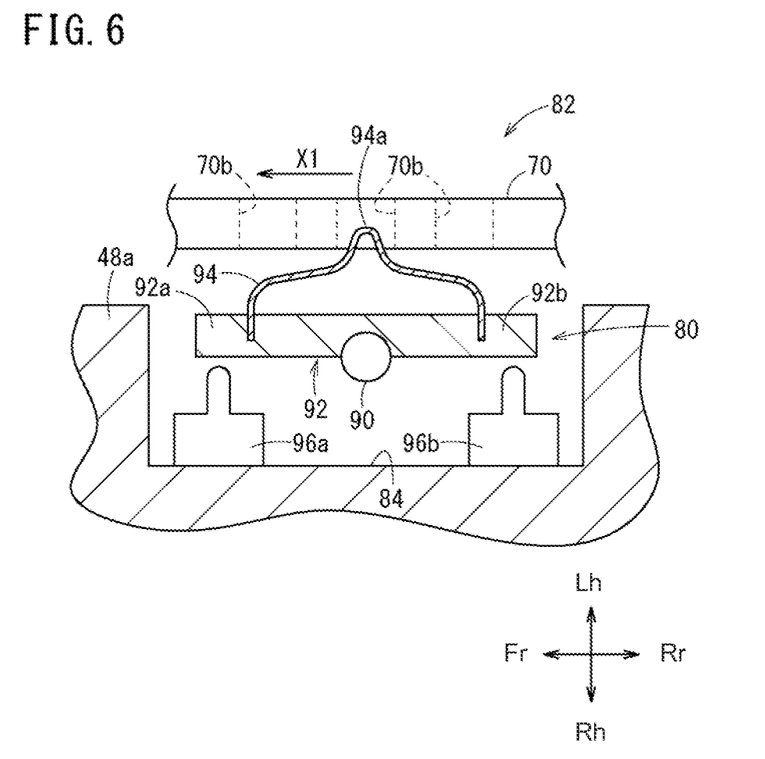
FIG. 6 is a cross-sectional view of a rotation detection portion, taken along line VI-VI of FIG. 5.

Next, the rotation detection portion 80 will be described in detail. FIG. 6 is a cross-sectional view of the rotation detection portion 80 taken along line VI-VI of FIG. 5. Note that front and rear, as well as left and right directions shown in FIG. 6 coincide with directions seen from a rider sitting on the seat of a straddle type vehicle 12.

The rotation detection portion 80 includes a swing shaft 90, and a swinging member 92 having swing arms 92a, 92b extending to both front and rear sides from the swing shaft 90. A flat spring 94 is attached on the left face side of the swinging member 92. The flat spring 94 has a protruding portion 94a protruding from its center toward the rotation detected body 70, and the protruding portion 94a is positioned on the left of the swing shaft 90. A two-button type switch 96a, 96b is provided on the right of the swinging member 92, and the switch 96a is arranged on the swing arm 92a side, whereas the switch 96b is arranged on the swing arm 92b side.

When an opening portion 70b of the rotation detected body 70 faces the protruding portion 94a, the protruding portion 94a is inserted into the opening portion 70b, and thus the switch 96a, 96b is not pressed by the swinging member 92. In this state, when the rotation detected body 70 moves in an arrow X1 direction (frontward), the protruding portion 94a is pushed frontward, so that the swing arm 92a swings in such a manner as to move rightward. Hence, when the rotation detected body 70 moves in the arrow X1 direction, the switch 96a is pressed. Then, when the rotation detected body 70 rotates further, the protruding portion 94a faces a part other than the opening portion 70b of the rotation detected body 70, and is pressed against the biasing force of the flat spring 94. When the next opening portion 70b faces the protruding portion 94a, pressure of the switch 96a is released. Thus, when the rotation detected body 70 rotates in the arrow X1 direction, the switch 96a is pressed every time the rotation detected body 70 rotates at a constant angle θ, and a clicking sense is generated.

Similarly, when the rotation detected body 70 rotates in a direction opposite to the arrow X1 direction (rearward), the switch 96b is pressed every time the rotation detected body 70 rotates at a constant angle θ, and a clicking sense is generated. Accordingly, the selected function menu can be switched forward every time the switch 96a is pressed, and the selected function menu can be switched backward every time the switch 96b is pressed. In this case, the arrow X1 direction is the first direction, and the direction opposite to the arrow X1 direction is the second direction.

Effects similar to those of the first embodiment can be achieved by the modified example. Note that in the modified example, the rotation detected body 70 need not be a magnetic body, and may be made of resin. Moreover, the rotation detected body 70 may be formed integrally with the selection controller 62 made of resin.

Next, a second embodiment will be described. Note that in an operation device 10 of the second embodiment, a configuration having a similar function as the first embodiment will be assigned an A at the back of the reference numeral, and descriptions thereof will be omitted unless otherwise required. Incidentally, configurations other than the operation device 10 are assigned the same reference numeral as the first embodiment.

Figure 7:
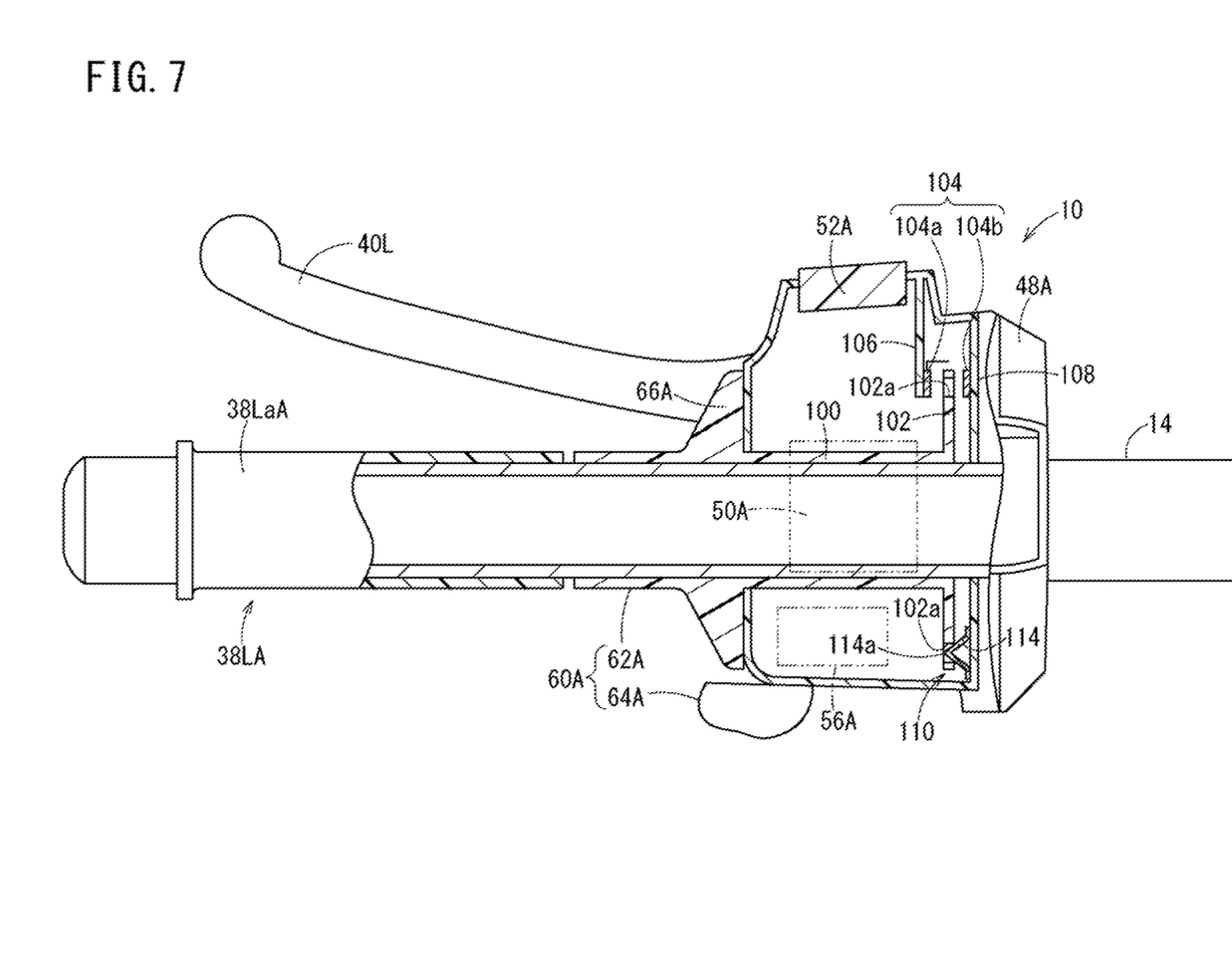
FIG. 7 is a cross-sectional view of main portions of a handle grip and a switch box, which constitute an operation device of a second embodiment.

FIG. 7 is a cross-sectional view of main portions of a handle grip 38LA and a switch box 48A, which constitute the operation device 10 of the second embodiment. A selection controller 62A of a controller 60A has an insertion portion 100 inserted into the switch box 48A. The insertion portion 100 is inserted into the switch box 48A along an outer cylindrical face of a handle bar 14 from an end portion of an enlarged diameter portion 66A on the switch box 48A side. A rotation detected body 102 formed into a circular flange shape is provided on the tip end of the insertion portion 100. Hence, the rotation detected body 102 is rotated together with rotation of the selection controller 62A. Multiple opening portions 102a are provided in a penetrating manner on an outer circumference end portion of the rotation detected body 102, along the direction of the outer circumference of the rotation detected body 102. As in the case of the opening portions 70b shown in FIG. 3, the multiple opening portions 102a are provided so as to form a circle at constant angle θ intervals, by using the center of the rotation detected body 102 as a reference point.

A light emitting element 104a and two light receiving elements 104b serving as a rotation detection portion 104, are provided inside the switch box 48A. The light emitting element 104a and two light receiving elements 104b are provided so as to face each other with the rotation detected body 102 interposed therebetween, and are arranged such that the opening portion 102a of the rotation detected body 102 is positioned between the light emitting element 104a and the light receiving elements 104b. The two light receiving elements 104b are arranged in parallel and adjacent to each other along the rotation direction of the rotation detected body 102. In the second embodiment, the light emitting element 104a is attached to a stay 106 provided inside the switch box 48, and the two light receiving elements 104b are attached to an inner wall 108 of the switch box 48A facing the rotation detected body 102.

The light emitting element 104a emits light toward the two light receiving elements 104b. When the opening portion 102a of the rotation detected body 102 is on the optical path of light emitted toward the light receiving elements 104b from the light emitting element 104a, the light receiving elements 104b receive light emitted from the light emitting element 104a. Meanwhile, when the opening portion 102a is not on the optical path of light emitted toward the light receiving elements 104b from the light emitting element 104a, light emitted from the light emitting element 104a is shielded by the rotation detected body 102, and thus the light receiving elements 104b do not receive light emitted from the light emitting element 104a. For this reason, there are states where the light receiving elements 104b receive and do not receive the light from the light emitting element 104a, while the rotation detected body 102 rotates at a constant angle θ. Accordingly, the selected function menu may be switched every time the light receiving elements 104b switch, from the state where they do not receive light to the state where they receive light.

Here, when the two light receiving elements 104b switch to the state where they do not receive light from the state where they receive light, the first light receiving element 104b that becomes incapable of receiving light differs depending on the rotation direction of the rotation detected body 102. To be specific, the light receiving element 104b arranged on the side opposite to the rotation direction of the rotation detected body 102 first becomes incapable of receiving light, and then the light receiving element 104b on the rotation direction side becomes incapable of receiving light. Accordingly, the rotation direction of the rotation detected body 102 can be identified, depending on the first of the two light receiving elements 104b that becomes incapable of receiving light. Note that the function menus to be selected are scrolled forward when the rotation detected body 102 rotates in a first direction, and the function menus to be selected are scrolled backward when the rotation detected body 102 rotates in a second direction.

A click mechanism 110 for generating a clicking sense at every constant angle in the rotary operation of the selection controller 62A is provided, between the insertion portion 100 and the inner wall 108 of the switch box 48A. The click mechanism 110 is configured of a flat spring 114 provided on the inner wall 108 of the switch box 48A, and the rotation detected body 102. The flat spring 114 is provided so as to face the opening portions 102a of the rotation detected body 102. The flat spring 114 has a protruding portion 114*a* protruding from its center toward the rotation detected body 102.

When the opening portion 102*a* of the rotation detected body 102 faces the protruding portion 114*a*, the protruding portion 114*a* is inserted into the opening portion 102*a*. Meanwhile, when apart other than the opening portion 102*a* of the rotation detected body 102 faces the protruding portion 114*a*, the protruding portion 114*a* is pressed against the biasing force of the flat spring 114. Thus, rotation of the selection controller 62A causes the flat spring 114 to generate a clicking sense at every constant angle θ.

Thus, according to the second embodiment, the selection controller 62A used to select multiple function menus of equipment is arranged in a position different from the multiple switches provided in the switch box 48A normally used in the straddle type vehicle 12. Accordingly, it is possible to prevent the rider from confusing operation of the multiple switches in the switch box 48A and operation of the selection controller 62A.

The selection controller 62A constitutes a part of the handle grip 38LA. Hence, the rider can easily select a function menu, by rotating the selection controller 62A with at least some of the fingers (such as the index finger and the thumb) while keeping hold of the handle grip 38LA. Additionally, since a part of the handle grip 38LA is used to function as the selection controller 62A, there is no need to provide a controller between the handle grip 38LA and the switch box 48A, and thus ease in operation of the multiple switches provided in the switch box 48A can be maintained.

Since the rotation detection portion 104 for detecting rotation of the selection controller 62A is provided in the switch box 48A, there is no need to provide an additional supporting member for supporting the rotation detection portion 104, and thus the selection controller 62A and the switch box 48A can be compactly arranged close to each other.

Since a determination controller 64A for determining the function menu selected by the selection controller 62A is provided, selection and determination of the function menu can be carried out by different controllers, whereby confusion in operation can be prevented. Since the determination controller 64A is provided so as to protrude toward the selection controller 62A side from the switch box 48A, the determination controller 64A can be arranged in the vicinity of the selection controller 62A, so that determination after selection of the function menu can be made easily.

Since the rotation detected body 102, the rotation detection portion 104, and the click mechanism 110 are provided inside the switch box 48A where dirt or water, for example, is less likely to enter, a variety of models and kinds of the rotation detected body 102, the rotation detection portion 104, and the click mechanism 110 can be employed. Additionally, since the click mechanism 110 for generating a clicking sense at every constant angle θ is provided, the rider can feel the operation of the selection controller 62A. For example, if the clicking sense is generated every time the selected function menu is switched, the switching of the selected function menu can be recognized by the feel, and thus the function menu can be selected easily.

Note that in place of the rotation detection portion 104, the second embodiment may also employ the rotation detection portion 68 using the magnetic sensor with magnet, consisting of the hall effect sensor and the magnet, described in the first embodiment. Moreover, in place of the rotation detection portion 104 and the click mechanism 110, the click mechanism 82 having the rotation detection portion 80 for detecting rotation of the selection controller 62 may be employed, as shown in the modified example of the first embodiment.

Figure 8:
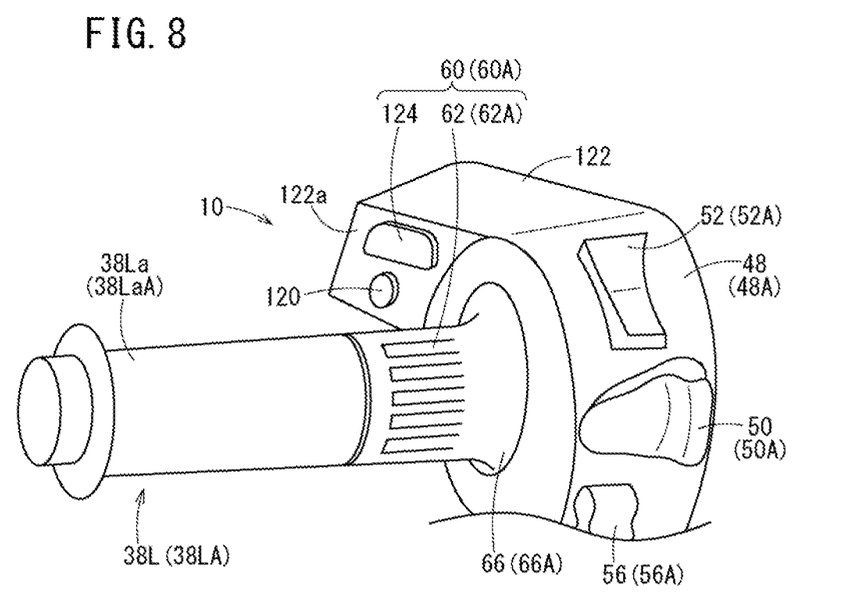
FIG. 8 is an outline perspective view of an operation device of a third embodiment.

Next, a third embodiment will be described. As shown in FIG. 8, the third embodiment includes a home button 120 for returning to a home screen (initial screen) of a function menu. When the home button 120 is pressed, the screen displayed on the display portion 30*a* or the meter device 18 returns to the home screen. In an operation device 10 of the third embodiment, a configuration having a similar function as the first or second embodiment is assigned the same reference numeral, and descriptions thereof will be omitted unless otherwise required. Note that a clutch lever 40L is omitted in FIG. 8.

The home button 120 is provided in front of a switch box 48 (48A), and is supported by a switch supporting portion 122, which is formed so as to protrude obliquely frontward toward the outer side of a handle grip 38L (38LA) in the axial direction from the front side of the switch box 48 (48A). The switch supporting portion 122 is provided integrally with the switch box 48 (48A). The home button 120 is provided on the side of a face 122*a* of the switch supporting portion 122 that faces the handle grip 38L (38LA). Accordingly, the home button 120 is supported by the switch supporting portion 122 in such a manner as to be positioned in front of the handle grip 38L (38LA). This allows the rider to operate the home button 120 with the left index finger, for example, while keeping hold of the handle grip 38L (38LA).

In addition, in place of the determination controller 64 (64A) of the first or second embodiment, the third embodiment includes a determination controller 124. That is, in the third embodiment, a controller 60 (60A) has a selection controller 62 (62A) and the determination controller 124. Like the home button 120, the determination controller 124 is supported by the switch supporting portion 122, and is provided on the side of the face 122*a* of the switch supporting portion 122. Accordingly, the determination controller 124 is supported by the switch supporting portion 122 in such a manner as to be positioned in front of the handle grip 38L (38LA). This allows the rider to operate the determination controller 124 with the left index finger, for example, while keeping hold of the handle grip 38L (38LA).

Thus, effects similar to those of the first embodiment (modified example included) and the second embodiment can be achieved by the third embodiment. The third embodiment also makes it easier to return to the home screen of a function menu.

Figure 9:
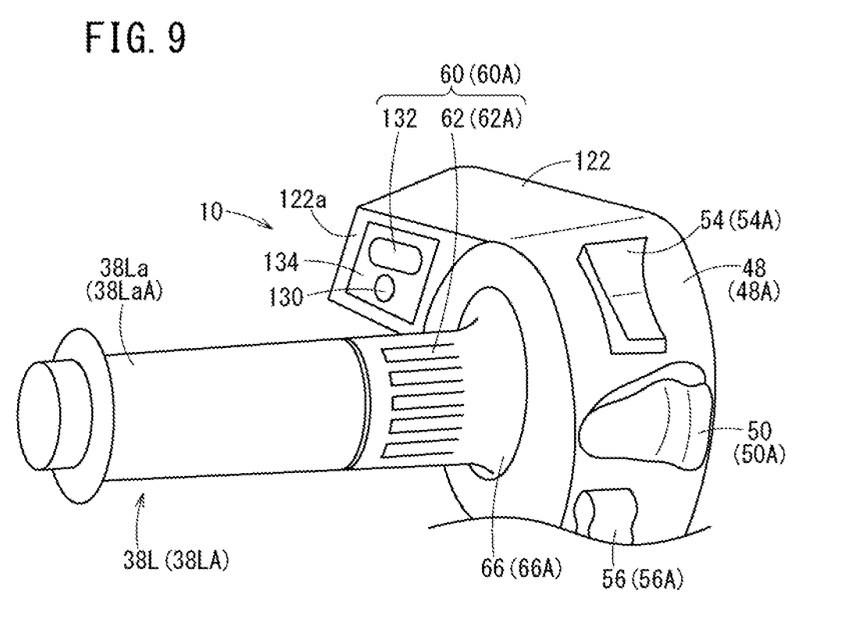
FIG. 9 is an outline perspective view of an operation device of a fourth embodiment.

In a fourth embodiment, in place of the home button 120 and the determination controller 124 of the third embodiment, an operation device 10 includes a home button 130 and a determination controller 132, as shown in FIG. 9. Note that in the fourth embodiment, a configuration having a similar function as the third embodiment is assigned the same reference numeral, and descriptions thereof will be omitted unless otherwise required. Note that a clutch lever 40L is omitted in FIG. 9.

The operation device 10 has a touch-screen liquid crystal display 134, and the home button 130 and determination controller 132 are configured by being displayed on the liquid crystal display 134. The liquid crystal display 134 is supported by a switch supporting portion 122, and is provided on the side of a face 122*a* of the switch supporting portion 122 that faces a handle grip 38L (38LA). Accordingly, the liquid crystal display 134 is supported by the switch supporting portion 122 in such a manner as to be positioned in front of the handle grip 38L (38LA). This allows the rider to operate the home button 130 and the determination controller 132 with the left index finger, for example, while keeping hold of the handle grip 38L (38LA). Note that in the fourth embodiment, a controller 60 (60A) has a selection controller 62 (62A) and the determination controller 132.

Thus, effects similar to those of the third embodiment can also be achieved by the fourth embodiment. Note that buttons may be provided on a touch screen that does not have a display function, and may be operated by touching them.

Figure 10:
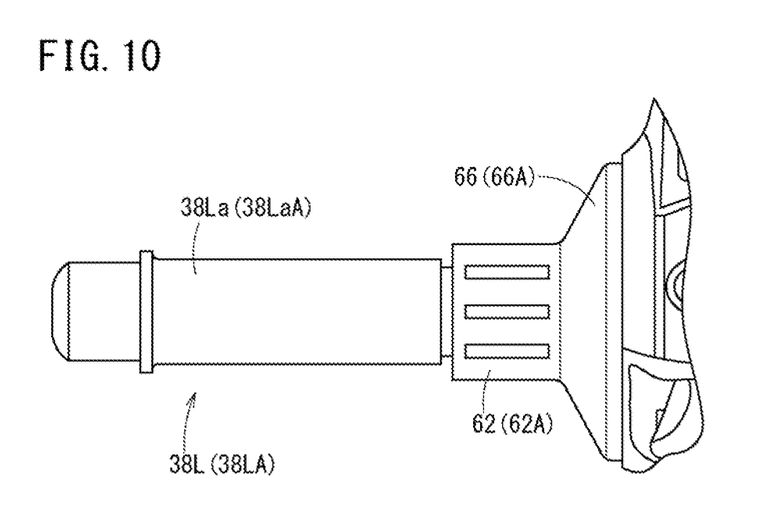
FIG. 10 is a view showing a handle grip of a fifth embodiment.

In the first to fourth embodiments, the handle grip 38L (38LA) has a substantially constant diameter except for the enlarged diameter portion 66 (66A). However, in a fifth embodiment, a selection controller 62 (62A) may have an appropriately larger diameter than a grip portion 38La (38LaA), as shown in FIG. 10. This makes it easier to recognize the position of the selection controller 62 (62A) while appropriately holding the handle grip 38L (38LA).

| Description of Reference Numerals: | |
|---|---|
| 10 operation device | 12 straddle type vehicle |
| 14 handle bar | 18 meter device |
| 30 navigation system | 30a display portion |
| 32 audio unit | 38L, 38LA, 38R handle grip |
| 40L clutch lever | 42, 48, 48A switch box |
| 48a wall portion | 60, 60A controller |
| 62, 62A selection controller | |
| 64, 64A, 124, 132 determination controller | |
| 66, 66A enlarged diameter portion | 68, 80, 104 rotation detection portion |
| 70, 102 rotation detected body | 70b, 102a opening portion |
| 72, 82, 110 click mechanism | 74, 84 concave portion |
| 76, 94, 114 flat spring | 100 insertion portion |
| 108 inner wall | 120, 130 home button |
| 122 switch supporting portion | 122a face |
| 134 liquid crystal display | |

The invention claimed is:

1. An operation device of a straddle type vehicle, said operation device comprising:
    a switch box having a plurality of switches, and provided adjacent to and on an inner side in an axial direction of a grip portion, which is configured to be held by a rider and is provided on both left and right ends of a handle bar extending in a left-right direction of the straddle type vehicle; and
    a controller configured to select a plurality of function menus of equipment incorporated in said straddle type vehicle, wherein
    said controller comprises
        a rotary selection controller constituting a part of said grip portion, and provided adjacent to said switch box, and
        a rotation detection portion provided in said switch box, and configured to detect rotation of said rotary selection controller.

2. The operation device according to claim 1, wherein:
    said controller includes a determination controller configured to determine a function menu selected by said rotary selection controller, wherein the determination controller is provided separately from said rotary selection controller, in such a manner as to protrude toward a rotary selection controller side from said switch box.

3. The operation device according to claim 1, wherein:
    said rotary selection controller includes an enlarged diameter portion on a side adjacent said switch box, wherein a rotation detected body is provided in said enlarged diameter portion, and wherein
    said rotation detection portion is provided on a wall portion of said switch box facing said enlarged diameter portion, and is configured to detect rotation of said rotation detected body.

4. The operation device according to claim 3, further comprising
    a click mechanism configured to generate a clicking sense at every constant angle in rotary operation of said rotary selection controller, said click mechanism being disposed between said enlarged diameter portion and said switch box facing said enlarged diameter portion.

5. The operation device according to claim 1, wherein:
    said rotary selection controller includes an insertion portion inserted into the switch box,
    wherein a rotation detected body is provided in said insertion portion,
    wherein said rotation detection portion is provided inside said switch box, and is configured to detect rotation of said rotation detected body, and
    wherein a click mechanism is configured to generate a clicking sense at every constant angle in the rotary operation of said rotary selection controller, said click mechanism being disposed between said insertion portion and an inner wall of said switch box.

6. An operation device of a straddle type vehicle, said operation device comprising:
    switch means for switching various functions, said switch means being provided adjacent to and on an inner side in an axial direction of a grip portion which is configured to be held by a rider and is provided on left and right ends of handle bar means which extend in a left-right direction of the straddle type vehicle; and
    controller means for selecting a plurality of function menus of equipment incorporated in said straddle type vehicle, wherein
    said controller means comprises rotary selection controller means constituting apart of said grip portion and provided adjacent to said switch means, and rotation detection means provided in said switch means for detecting rotation of said rotary selection control means.

7. The operation device according to claim 6, wherein said controller means includes determination controller means for determining a function menu selected by said rotary selection controller means, and wherein the determination controller means is provided separately from the rotary selection controller means in such a manner so as to protrude toward said rotary selection controller side from said switch means.

8. The operation device according to claim 6, wherein said rotary selection controller means includes an enlarged diameter portion on a side adjacent said switch means, wherein a rotation detected body is provided in said enlarged diameter portion, and wherein said rotation detection means is disposed on a wall portion of said switch means facing said enlarged diameter portion, and is for detecting rotation of said rotation detected body.

9. The operation device according to claim 8, further comprising
    click means for generating a clicking sense at every constant angle in rotary operation of said rotary selection controller means, said click means being disposed between said enlarged diameter portion and said switch means facing said enlarged diameter portion.

10. The operation device according to claim 6, wherein:
said rotary selection controller means includes an insertion portion inserted into the switch means,
wherein a rotation detected body is provided in said insertion portion,
wherein said rotation detection portion is provided inside said switch means, and is for detecting rotation of said rotation detected body, and
wherein a click means is provided for generating a clicking sense at every constant angle in the rotary operation of said rotary selection controller means, said click means being disposed between said insertion portion and an inner wall of said switch means.

11. The operation device according to claim 6, wherein said switch means comprises a plurality of switches.

* * * * *